United States Patent
Ruberg

(10) Patent No.: US 6,675,054 B1
(45) Date of Patent: Jan. 6, 2004

(54) METHOD AND APPARATUS OF SUPPORTING AN AUDIO PROTOCOL IN A NETWORK ENVIRONMENT

(75) Inventor: Alan T. Ruberg, Foster City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/063,341

(22) Filed: Apr. 20, 1998

(51) Int. Cl.$^7$ ............................................. G06F 17/00
(52) U.S. Cl. ........................................................ 700/94
(58) Field of Search ........................... 700/94; 381/310; 370/260, 263, 265, 266, 389

(56) References Cited

U.S. PATENT DOCUMENTS

| | | |
|---|---|---|
| 5,291,585 A | 3/1994 | Sato et al. |
| 5,335,320 A | 8/1994 | Iwata et al. |
| 5,345,550 A | 9/1994 | Bloomfield |
| 5,347,627 A | 9/1994 | Hoffmann et al. |
| 5,384,911 A | 1/1995 | Bloomfield |

(List continued on next page.)

FOREIGN PATENT DOCUMENTS

| | | |
|---|---|---|
| WO | WO 97/14238 | 4/1997 |
| WO | WO 97/23973 | 7/1997 |
| WO | WO 97/40611 | 10/1997 |

OTHER PUBLICATIONS

Ronald L. Johnson, "The Dynamic Incremental Compiler of APL/3000" Proceedings of the API '79 Conference, published as APL Quote Quad, 9(4), p 82–87.

Leo J. Guibas et al., "Compilation and Delayed Evaluation in APL," Fifth Annual Synposium on Principles in Programming Languages, p 1–8, 1978.

Gleen Krasner "The Smalltalk–80 Virtual Machine" BYTE Publications Inc., Aug. 1991, pp 300–320.

International Telecommunication Union, ITU–T H.323: Packet–Based Multimedia Communications Systems, Feb. 1998.

*Primary Examiner*—Minsun Oh Harvey
(74) *Attorney, Agent, or Firm*—O'Melveny & Myers LLP

(57) ABSTRACT

A method and apparatus of supporting an audio protocol in a network environment. Audio processing and hardware requirements associated with a receiver are minimized by specifying a single audio protocol for transmission of audio data between transmitters on a network and the receiver. The protocol specifies a sampling rate, bit resolution and quantization scheme which allow for high sound quality and further minimize the complexity of the receiver. Transmitters are equipped with drivers to provide for conversion of audio data into the designated protocol as needed. Aspects of the designated protocol are provided to compensate for problems associated with transmitting audio streams over a network. The designated protocol specifies a format for interleaving audio samples within data packets to minimize errors which are the result of consecutive missing audio data samples due to packet loss. The receiver may further compensate for missing audio data samples through interpolation. In accordance with the designated protocol, a sequence size is specified to govern how the audio data is processed. The transmitter controls the sequence size adaptively to maintain audio latency within a limit specified for each audio application. The designated protocol also provides for determination of a mix mode and a number of channels for specifying how audio data with multiple channels is mixed and routed among multiple audio output devices.

28 Claims, 10 Drawing Sheets

U.S. PATENT DOCUMENTS

| | | |
|---|---|---|
| 5,412,772 A | 5/1995 | Monson |
| 5,414,806 A | 5/1995 | Richards |
| 5,423,034 A | 6/1995 | Cohen-Levy et al. |
| 5,430,836 A | 7/1995 | Wolf et al. |
| 5,436,637 A | 7/1995 | Gayraud et al. |
| 5,448,695 A | 9/1995 | Douglas et al. |
| 5,461,399 A | 10/1995 | Cragun |
| 5,461,710 A | 10/1995 | Bloomfiled et al. |
| 5,473,745 A | 12/1995 | Berry et al. |
| 5,491,784 A | 2/1996 | Douglas et al. |
| 5,493,638 A | 2/1996 | Hooper et al. |
| 5,509,116 A | 4/1996 | Hiraga et al. |
| 5,526,517 A | 6/1996 | Jones et al. |
| 5,544,288 A | 8/1996 | Morgan et al. |
| 5,546,519 A | 8/1996 | Berry |
| 5,548,702 A | 8/1996 | Li et al. |
| 5,550,968 A | 8/1996 | Miller et al. |
| 5,559,942 A | 9/1996 | Gough et al. |
| 5,564,003 A | 10/1996 | Bell et al. |
| 5,566,330 A | 10/1996 | Sheffield |
| 5,570,462 A | 10/1996 | McFarland |
| 5,572,643 A | 11/1996 | Judson |
| 5,694,603 A | 12/1997 | Reiffin |
| 5,694,604 A | 12/1997 | Reiffin |
| 6,125,115 A * | 9/2000 | Smits .................. 381/310 |

\* cited by examiner

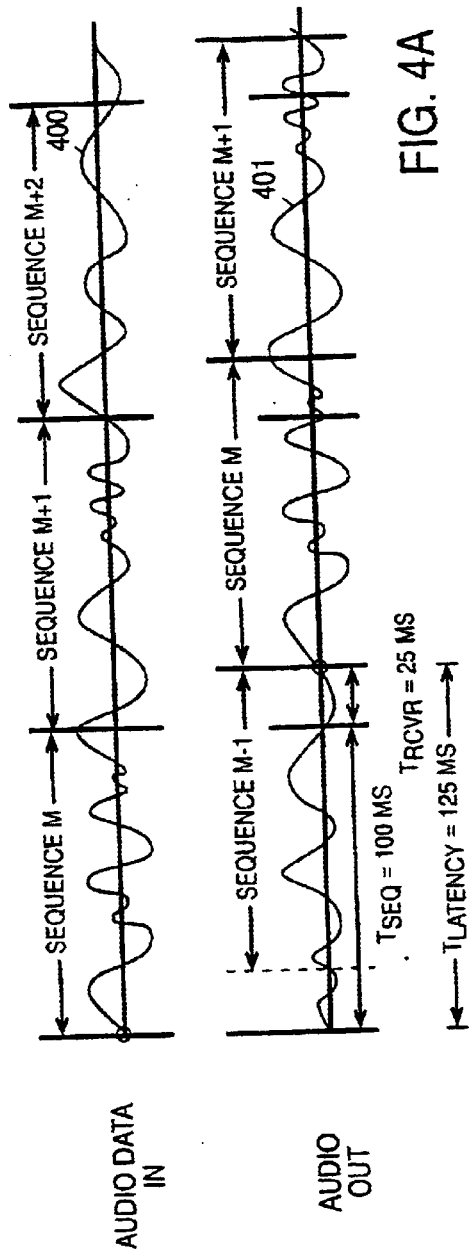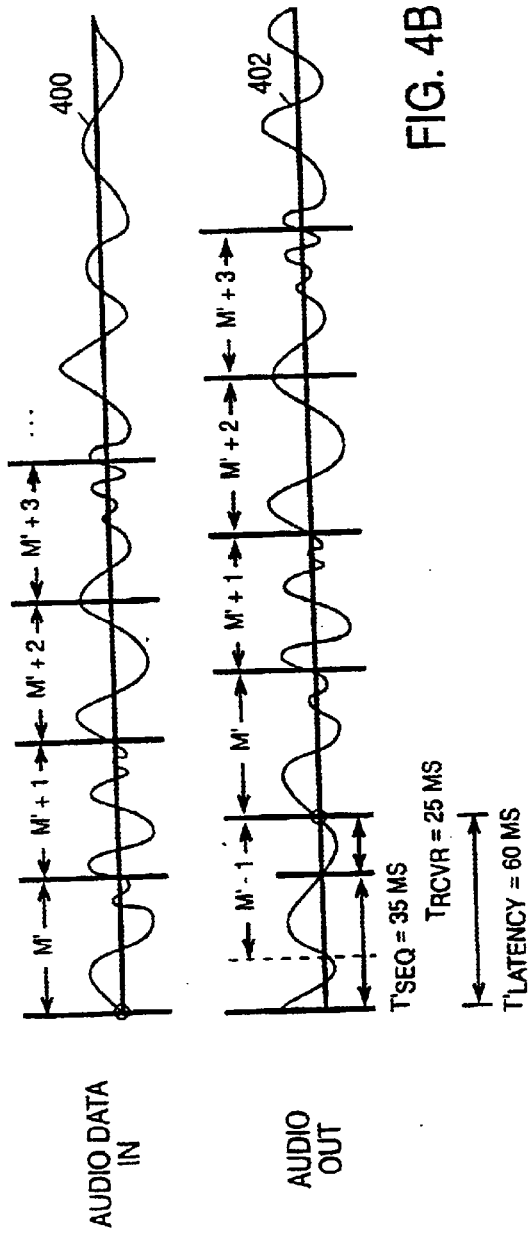

METHOD AND APPARATUS OF SUPPORTING AN AUDIO PROTOCOL IN A NETWORK ENVIRONMENT

BACKGROUND OF THE INVENTION

1. Field of the Invention

This invention relates to the field of digital audio, and, more specifically, to digital audio applications in a network environment.

Sun, Sun Microsystems, the Sun logo, Sparc, Java and all Java-based trademarks and logos are trademarks or registered trademarks of Sun Microsystems, Inc. in the United States and other countries.

2. Background Art

Computers and computer networks are used to exchange information in many fields such as media, commerce, and telecommunications, for example. One form of information that is commonly exchanged is audio data, i.e., data representing a digitized sound or sequence of sounds. Voice telephone transmissions and video conferencing feeds are examples of telecommunication information which include audio data. Other examples of audio data include audio streams or files associated with digitized music, radio and television performances, or portions thereof, though audio data may be associated with any type of sound waveform. It is also possible to synthesize sound waveforms by artificially generating audio data having desired magnitude and frequency characteristics.

For the purposes of this discussion, the exchange of information between computers on a network occurs between a computer acting as a "transmitter" and a computer acting as a "receiver." In audio applications, the information contains audio data, and the services provided by the transmitter are associated with the processing and transmission of the audio data. A problem with current network systems is that multiple services, provided by one or more computers acting as transmitters, may provide audio data using different audio protocols. The complexity of the receiver is necessarily increased by the need to accommodate each of the different audio protocols. Further problems associated with the transmission of audio data over a network include errors in the audio signal caused by packet loss, as well as undesirable latency in real-time, or time-critical, audio-related applications such as video conferencing. The following description of audio technology and an example network scheme are given below to provide a better understanding of the problems involved in transmitting audio data over a network.

General Audio Technology

Audio data technology allows for the capture, storage, transmission and reproduction of sound. To understand how sound can be represented electronically as audio data, it is useful to understand the general nature of sound. Sound refers to a pressure wave propagated through a medium, such as the air. A pressure wave of this sort may be generated, for example, by the vibration of the vocal chords in a human throat, as when speaking or singing, or by a collision of two objects, where a portion of the energy of the collision is dissipated as a pressure wave. The medium through which the pressure wave is propagated attenuates the pressure wave over time in accordance with the physical characteristics, or "acoustic properties," of the medium.

When pressure waves meet the eardrum of a human ear, the eardrum flexes and vibrates in response. The vibration, or modulation, in the eardrum is interpreted by the brain as a sound. An electronic capture mechanism, such as a microphone, has a similar mechanism for detecting pressure waves and generating an electronic signal containing corresponding audio data. A sensor mechanism in the microphone is physically modulated by a pressure wave, and the modulation is electro-mechanically transformed into an electronic signal. The electronic signal may be transmitted or stored directly, or, as is now typically done, the electronic signal may first be digitized (i.e., sampled and quantized). A sound is reproduced from audio data by transforming the electronic signal back into a pressure wave, for example, by electro-mechanically modulating a membrane to create the appropriate pressure wave.

Sound Waveforms and Data Sampling

The electronic signal corresponding to a captured sound may be graphically represented by a sound waveform, such as sound waveform 100 illustrated in FIG. 1A. The vertical axis of FIG. 1A, as well as that of FIGS. 1B and 1C, represents the amplitude of the sound waveform, with the horizontal axis representing time over a period of one millisecond. Sound waveform 100 is a continuous waveform. FIGS. 1B and 1C illustrate discrete sampled waveforms generated by sampling sound waveform 100 at sampling rates of twenty-four kilohertz and eight kilohertz, respectively.

A sampling rate is expressed in hertz or samples per second. A sampling rate of twenty-four kilohertz implies that twenty-four thousand samples are taken per second, or one sample is taken approximately every forty-two microseconds. As one would expect, the sampled waveform of FIG. 1C, with a sampling rate of eight kilohertz, has one-third as many samples as the sampled waveform of FIG. 1B.

Higher sample rates generally entail correspondingly greater resource costs in terms of storage and transmission bandwidth requirements to accommodate the data associated with the larger number of samples. However, a higher sampling rate generally provides a more precise reproduction of a sound waveform. The ability to reproduce an original waveform from a set of sampled data is determined by the frequency characteristics of the original waveform and the Nyquist limit of the sample rate. Every signal or waveform has frequency characteristics. A relatively fast changing signal level is associated with higher frequency behavior, whereas a signal level that changes slowly is associated with lower frequency behavior. Most signals have frequency contributions across a broad spectrum of frequencies. The frequencies associated with audible signals, and hence sound waveforms, reside generally within the range of 20–20,000 kilohertz.

According to Nyquist theory, a sampled signal can reconstruct an original waveform from sampled data if the original waveform does not contain frequencies in excess of one-half of the sampling rate. That is, if an original waveform is bandlimited below ten kilohertz, a sampling rate of twenty kilohertz or higher would be sufficient to reproduce the original waveform without distortion. When relatively low sampling rates are used, it is common to pre-filter waveforms to bandlimit frequency behavior and prevent or diminish distortion caused by the sampling process. However, filtering of a sound waveform may result in lower sound quality because higher frequency components of the waveform are attenuated.

Different audio protocols may use different sample rates for audio data. A receiver that is generating sound output from audio data needs to be able to handle the different possible sample rates of the different audio protocols to maintain correct timing intervals between samples during reconstruction of the sound waveform from the audio data samples.

Data Resolution and Quantization Schemes

Another aspect of audio data that differs between audio protocols is the quantization-scheme used to quantize or digitize the amplitude of the sampled audio data into digital values that can be represented by a fixed number of bits. The number of bits used to represent each sample of audio data is the resolution of the given audio protocol. Typically, for M bits of resolution, $2^M$ possible digital values or quantization levels exist for sample quantization. For example, eight bits of resolution provide $2^8$, or 256, quantization levels. Higher resolution typically provides for better sound reproduction as sound samples are more precisely represented. Higher resolution also entails higher costs in storage resources and transmission bandwidth to support the larger number of bits.

Just as there are different possible resolutions for audio data, there are also different quantization schemes for distributing the quantization levels across an amplitude range. FIGS. 2A and 2B illustrate examples of linear and non-linear quantization functions, respectively. The horizontal axis of each of FIGS. 2A and 2B represent the sample value of the audio data prior to quantization. The vertical axis of each figure represents the quantization levels of the audio data after quantization is performed. A stair-step function is implemented where all sample values within fixed ranges along the horizontal axis are assigned to discrete quantization levels on the vertical axis.

In the linear quantization function of FIG. 2A, the quantization levels are evenly distributed across the range of values. The result is a stair function that approximates a straight line having a slope of one. In the non-linear quantization function of FIG. 2B, quantization levels are distributed with greater numbers of quantization levels near zero amplitude and fewer quantization levels as the amplitude increases. The result is a stair function that approximates a parabolic or logarithmic curve. An advantage of non-linear quantization schemes is that there is greater relative resolution near zero amplitude, providing improvements in signal-to-noise ratio. A disadvantage of non-linear quantization schemes is that they are more complex to implement than the linear scheme. Different audio data protocols may specify a linear quantization scheme or one of several different commonly-used non-linear quantization schemes.

Audio Channels

Audio data has been described above in terms of a single sound waveform. It is possible for multiple sounds, such as multiple voices or instruments, to be represented in a single composite sound waveform by superposition of the individual sound waveforms associated with each sound. The composite waveform thus contains the sound information of all of the sounds. It is also possible to send audio data with multiple "channels." Each channel of audio data contains the sound information (e.g., digitized samples) of a sound waveform. Each channel may be output from a different audio output device (e.g., speaker), or multiple channels may be "mixed" into a composite sound waveform for output from a single audio output device.

The use of multiple channels is often used to provide a spatial effect for sound reproduction, such as with two-channel stereo audio or four-channel surround sound. The spatial effect is created by outputting specific audio channels from pre-positioned speakers. Stereo audio, for example, specifies a left channel and a right channel, meaning that a first channel of audio data is reproduced from a speaker positioned to the left of a listener, and a second channel of audio data is reproduced from a speaker positioned to the right of the listener. More complex systems may use greater numbers of channels and output devices. The particular channel arrangement may vary for different audio protocols.

Network Transmission of Audio Data

As has been described, audio protocols may vary in sample rate, bit resolution, quantization scheme, and channel arrangement. These variations allow for a large number of different possible audio protocols. It becomes problematic for a receiver on a network to handle all possible audio protocols that might be used by different transmitters acting as audio data sources on the network. The problems associated with multiple audio protocols are described below with reference to the sample network system illustrated in FIG. 3. FIG. 3 illustrates a sample network system comprising multiple transmitters 300A–300C for sourcing audio data and a single receiver 303 acting as a destination computer. Receiver 303 is equipped with one or more speakers for providing sound output associated with received audio data.

In the example of FIG. 3, transmitters 300A, 300B and 300C, and receiver 303 are coupled together via network 302, which may be, for example, a local area network (LAN). Transmitter 300A transmits audio data along network connection 301A to network 302 using audio protocol A. Transmitter 300B transmits audio data along network connection 301B to network 302 using audio protocol B. Transmitter 300C transmits audio data along network connection 301C to network 302 using audio protocol C. Thus, receiver 303 may receive audio data over network connection 305 from network 302 under any of audio protocols A, B or C, as well as any other protocols used by other transmitters connected to network 302, or used by multiple services embodied within one of transmitters 300A–300C.

Receiver 303 may be equipped with different hardware for audio processing to support each audio protocol, but this increases the complexity of the receiver, and necessitates hardware upgrades when new audio protocols are developed. For systems wherein it is a goal to minimize processing and hardware requirements for a receiver, the added complexity of supporting multiple protocols is undesirable.

Problems Associated With Latency and Packet Loss

In addition to the problems associated with multiple audio protocols, audio systems also suffer from problems associated with latency and packet loss. Latency refers to the time delay between the receipt of audio data at a receiver and the output of a corresponding pressure wave from an audio output device of the receiver. Audio latency is particularly problematic in applications where the audio output is intended to be synchronized with other events, such as video output. For example, latency in the audio portion of a video teleconferencing communication or a television transmission may result in a timing mismatch between the visual cues on a display, such as a character's mouth moving, and the associated audio output, such as the speech associated with the mouth movements. Such timing mismatches may result in an unsatisfactory audio/visual presentation.

Packet loss is a common occurrence on many network connections, and can result in the loss of many samples of audio data. Audio data is transmitted over a network as a group of samples encapsulated within a data packet. When a packet is received at a receiver, the samples are extracted from the packet and used to reconstruct the sound waveform. When packet loss occurs, many samples of audio data are left out of the reconstruction of the sound waveform.

For streaming audio, the audio data is extracted from its respective packet and processed immediately for output. Typically, it is not possible for a receiver to request that a transmitter retransmit a lost packet, and for the transmitter to respond with the lost packet in sufficient time for the receiver to correct the audio output. The corresponding portion of the sound waveform would have already been processed out of the output device as a pressure wave. The loss of audio data through packet loss can result in unwanted degradation of output sound quality, usually periods of silence, particularly with poor network connections where packet loss occurs relatively frequently.

SUMMARY OF THE INVENTION

A method and apparatus of supporting an audio protocol in a network environment is described. In an embodiment of the invention, audio processing and hardware requirements associated with a receiver are minimized by specifying a single audio protocol for transmission of audio data between transmitters on a network and the receiver. The protocol specifies a sampling rate, bit resolution and quantization scheme which allow for high sound quality and further minimize the complexity of the receiver. Transmitters are equipped with drivers to provide for conversion of audio data into the designated protocol as needed.

Aspects of the designated protocol are provided to compensate for problems associated with transmitting audio streams over a network. The designated protocol specifies a format for interleaving audio samples within data packets to minimize errors which are the result of consecutive missing audio data samples due to packet loss. The receiver may further compensate for missing audio data samples through interpolation. In accordance with the designated protocol, a sequence size is specified to govern how the audio data is processed. The transmitter controls the sequence size adaptively to maintain audio latency within a limit specified for each audio application. The designated protocol also provides for determination of a mix mode and a number of channels for specifying how audio data with multiple channels is mixed and routed among multiple audio output devices.

BRIEF DESCRIPTION OF THE DRAWINGS

FIGS. 4A and 4B show input and output waveforms illustrating an application of latency control in accordance with an embodiment of the invention.

DETAILED DESCRIPTION OF THE INVENTION

Figure 1A:
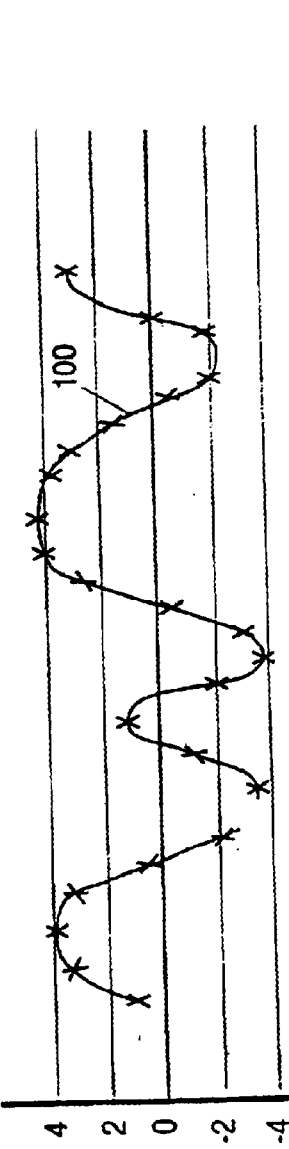
FIG. 1A illustrates an audio waveform with respect to time.
Figure 1B:
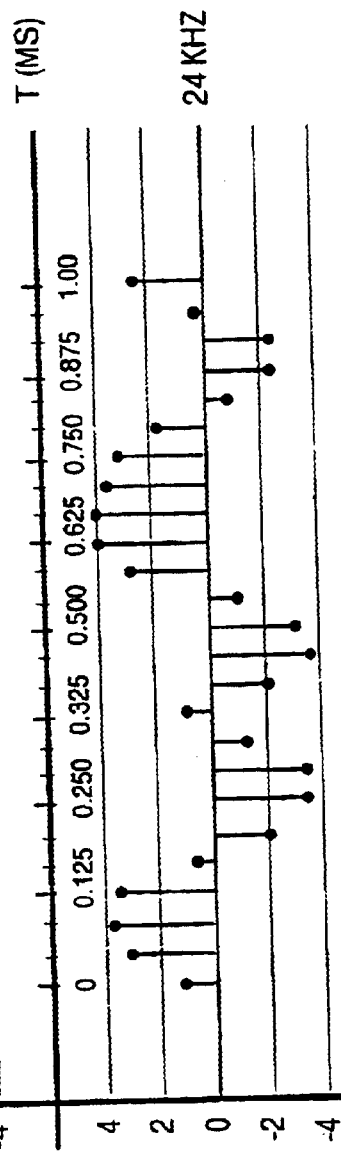
FIGS. 1B and 1C illustrate sampled waveforms at sampling rates of twenty-four kilohertz and eight kilohertz, respectively.
Figure 1C:
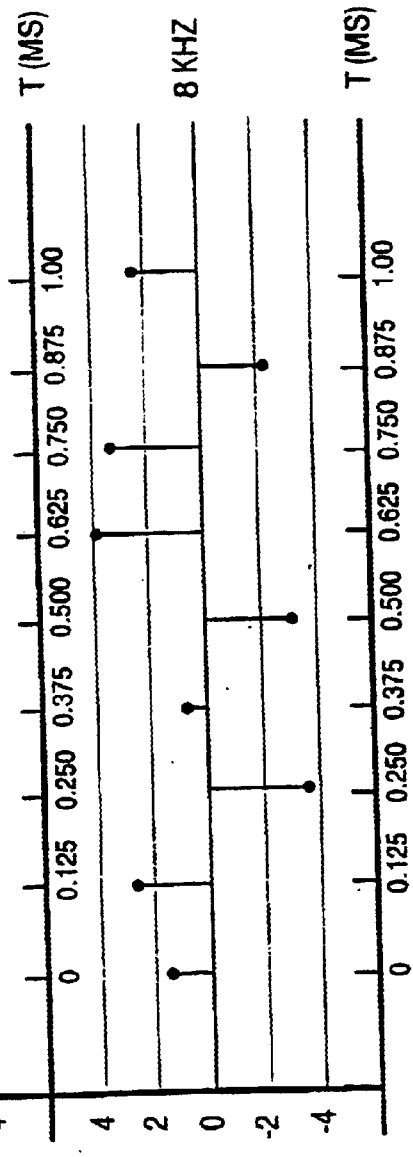
Figure 2A:
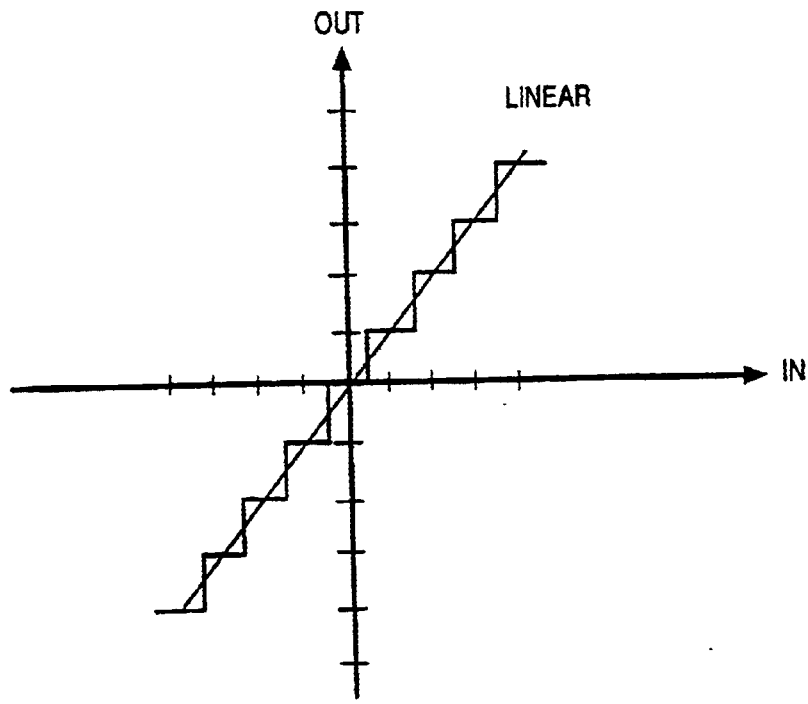
FIG. 2A illustrates an example of a linear quantizing function.
Figure 2B:
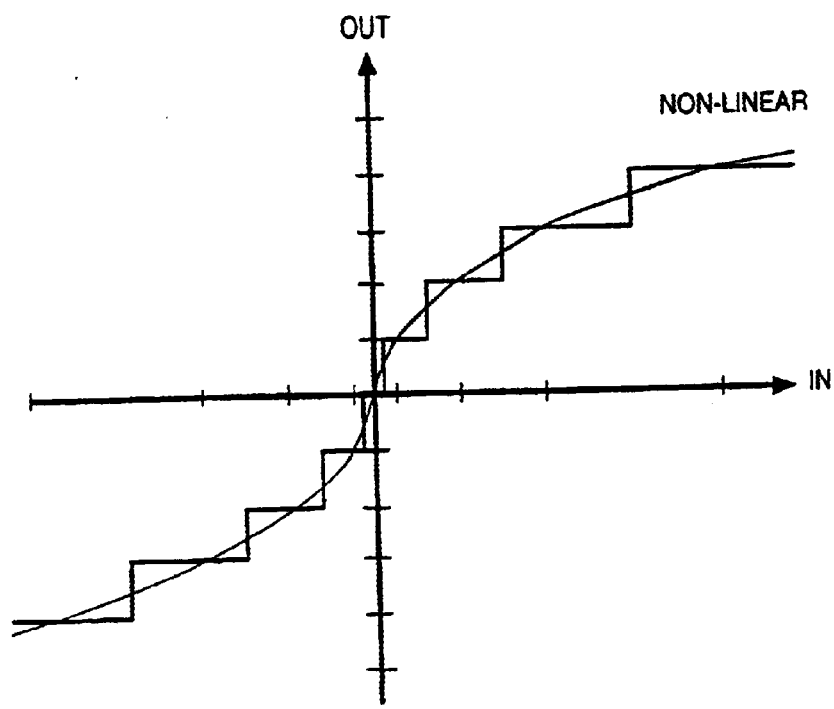
FIG. 2B illustrates an example of a non-linear quantizing function.
Figure 3:
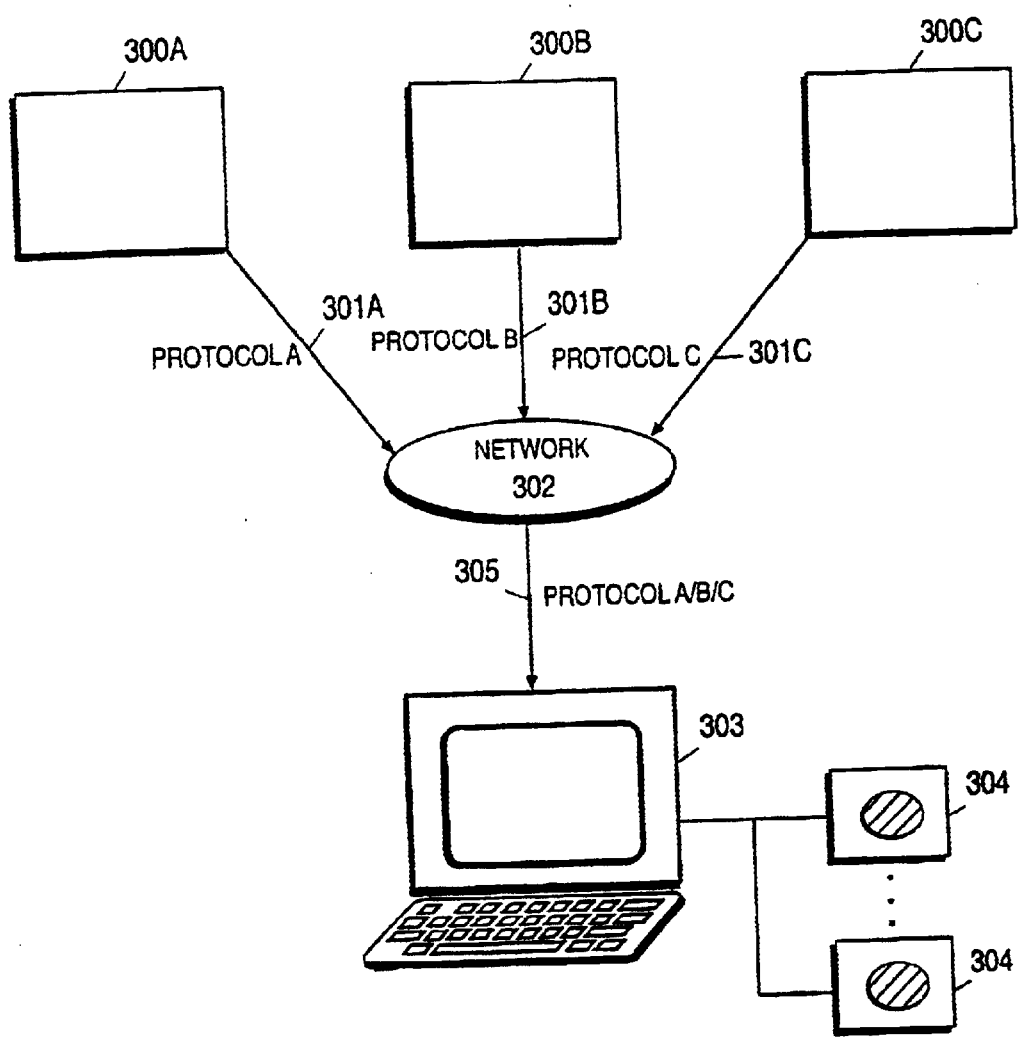
FIG. 3 is a block diagram of a network system having a single receiver and multiple transmitters.

The invention is a method and apparatus of supporting an audio protocol in a network environment. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Single Audio Protocol for Networked Transmissions

In an embodiment of the invention, a single audio protocol is used for transmission of audio data between a computer acting as a "transmitter" and another computer acting as a "receiver." The source of the audio data is responsible for supplying audio data in accordance with the designated protocol. For example, a transmitter and its internal audio services are configured to perform any necessary protocol transformations to bring audio data into conformance with the designated protocol before transmission to a receiver. Hardware and processing requirements of the receiver are minimized as only one audio protocol need be supported at the receiver.

Though discussed in this specification primarily as being applied to audio data transmitted one-way from a transmitter to a receiver, audio data may also be transmitted from the receiver to the transmitter using the designated protocol. The transmitter may then process the audio data in the form of the designated protocol, or the transmitter may convert the audio data into another audio protocol for further processing.

The designated protocol is chosen to give very high sound quality to encompass all other audio protocols. The high sound quality of the designated protocol ensures that any necessary protocol transformations by a transmitter do not result in a loss of sound quality from the original audio data. An example of a protocol that provides high sound quality is a protocol specifying a sampling rate of forty-eight kilohertz, a resolution of sixteen-bits, and a linear quantization scheme. The audible range of frequencies detectable by the human ear is between the range of twenty hertz to twenty kilohertz (20–20,000 Hz). A forty-eight kilohertz sampling rate is theoretically sufficient to reconstruct a twenty-four kilohertz sound waveform. This allows the designated protocol to reconstruct any sound waveform in the audible range with four kilohertz of extra frequency bandwidth to spare.

Sixteen-bit audio sample resolution allows for 65,536 quantization levels. This is sufficient to provide equal or greater resolution than most or all consumer sound protocols. The high resolution provided by the sixteen-bit samples, allows for a linear quantization scheme to be used while still providing sufficiently high resolution for low amplitude signals. The use of a linear quantization scheme simplifies the processing and hardware required to reconstruct the sound waveform from the digital audio data. For example, if a digital-to-analog converter (DAC) is used to drive a speaker, no pre-processing needs to be performed to linearize the audio data and no non-linear conversion function is required to be embodied within the DAC itself.

The transmitters may support audio applications using the designated protocol, or the transmitters may be configured with drivers to convert between other audio protocols and the designated protocol, for example, using multi-rate digital filtering techniques to perform sample rate conversion and quantization tables to convert non-linearly quantized data to linearly quantized data. Resolution conversion may generally be performed by padding lower resolution audio data with further least-significant bits (LSB's). Dithering techniques may also be used in the padding of LSB's.

In an embodiment of the invention, data packets are used to transmit audio data samples between a transmitter and a receiver using a connectionless datagram scheme and packet format. The datagram scheme is considered connectionless because each datagram is treated independently, with no significant shared state between datagrams. This allows for more robust system performance on unreliable networks where individual datagrams may be frequently lost.

Within the packet format, the audio data packet comprises the following information:

Audio sequence number—An audio stream is processed as a series of audio data sequences. The audio sequence number permits the current data packet to be associated with the correct audio data sequence for processing.

Sequence length—The sequence length is specified in terms of audio data samples and is an element of latency control described later in this specification.

Packet length—The packet length is specified in terms of audio data samples and is used in the extraction of interleaved data from the data packet.

Interleave size—The interleave size is used to specify the interleave interval of the current audio sequence.

Interleave offset—The interleave offset is used to specify the audio sample of the audio sequence which corresponds to the first audio sample in the current data packet. The sequence length, packet length interleave size and interleave offset are used in interleaved processing operations described later in this specification.

Mixer mode—The mixer mode specifies a particular mixing and output arrangement for the audio channels included in the current data packet. Mixing modes and channel assignments are described later in this specification.

Number of audio channels—The number of audio channels is used to parse and process the audio sample data as appropriate channel data.

Audio data—The audio data includes all of the audio data samples of the current data packet (packet length * number of audio channels * 16 bits).

Adaptive Latency Control

Many audio applications are subject to latency requirements. This means that only a specified amount of delay can exist between the time a receiver receives audio data and the time at which the audio data is output from the receiver in the form of a pressure wave. Latency, either in excess of the specified amount or less than the specified amount, is considered unsatisfactory. For example, a television feed into a receiver might be considered as unsatisfactorily presented if the audio output associated with the television feed is offset from the appropriate timing point in the video output.

With respect to AV (audio/visual) synchronization, people are accustomed to hearing events after seeing the events because of the difference between the speed of light, which delivers visual information relatively instantaneously, and the speed of sound, which delivers audio information with a delay of approximately one millisecond for every foot of distance from the event. Substantial cognitive dissonance can result when audio and visual events are perceived out of order.

Contributing factors in audio latency include a fixed delay associated with the receiver itself, and a delay created by the separation of the sound waveform into individual sequences, as described below. The fixed delay of the receiver is associated with buffering delays and hardware delays for converting the digital audio data into an appropriate drive signal for an output device, such as a speaker, as well as any propagation delays within the output device itself. This fixed receiver delay is typically on the order of twenty-five milliseconds, but may vary for different receiver hardware configurations.

A sound waveform is generally broken up into individual sequences of samples. When audio data is played, i.e., reconstructed into a pressure wave, a sequence is first constructed from samples delivered in packets, and then, when the sequence is complete, the sequence is processed through the system to the output device. The next sequence is constructed while the first sequence is being output, and cannot begin being output itself until the first sequence finishes. This sequential processing causes a delay contribution to the overall latency which is equal to the length of the sequence. For example, if audio data is being processed in one hundred millisecond sequences, the latency of the audio system is equal to one hundred milliseconds from the contribution of the sequential delay plus the fixed receiver delay. Larger sequence lengths are desired to permit interleaving of data samples as will be discussed in a following section of this specification. However, larger sequence lengths increase latency. Performance may be optimized by utilizing the largest sequence length that does not cause the audio latency to exceed desired limits.

An embodiment of the invention adaptively controls the audio latency of the system to constrain the latency within desired limits. Improved audio performance is thus achieved. To perform latency control, the maximum allowable latency for a given audio application is specified The maximum allowable latency may be determined based on the time-critical needs or time-synchronized performance issues of the audio application. The fixed receiver delay is also specified. From the maximum allowable latency and the fixed receiver delay, a transmitter is able to determine the maximum length of an audio sequence that will satisfy the latency requirements. The relationship is:

maximum sequence length=maximum allowable latency−fixed receiver delay

The transmitter determines a current sequence length that is equal to or less than the maximum sequence length calculated above. The current sequence length is communicated to the receiver along with the audio data so that processing of audio sequences is performed in accordance with the specified current sequence length. The sequence length may be altered as latency requirements change, so that optimum performance is achieved. Particular latency requirements of individual audio applications can thus be satisfied in an adaptive manner.

FIGS. 4A and 4B illustrate the effect of latency control on the output of a sound waveform. Each Figure displays input and output waveforms referenced to a horizontal time axis. FIG. 4A comprises waveform 400 representing the audio data input received at the receiver. Waveform 400 is separated into one hundred millisecond sequences labeled sequence M, sequence M+1 and sequence M+2. FIG. 4A also comprises waveform 401 representing the actual audio output leaving the receiver through an audio output device. Waveform 401 is substantially identical to waveform 400 except for a timing offset due to the audio latency of the system. The beginning of sequence M in waveform 401 is delayed from the beginning of sequence M in waveform 400 by an amount $T_{LATENCY}$. $T_{LATENCY}$ is determined by the sum of the length of sequence M, $T_{SEQ}$, and the fixed receiver delay, $T_{RCVR}$. In the example of FIG. 4A, $T_{SEQ}$=100 ms and $T_{RCVR}$=25 ms for a total latency of $T_{LATENCY}$=125 ms.

For some audio applications, a latency of 125 milliseconds may be too large. FIG. 4B illustrates the effect of decreasing the sequence length of the waveform to 35 milliseconds to achieve a desired maximum latency of 60 milliseconds. FIG. 4B comprises waveform 400 representing the audio data input received at the receiver. In FIG. 4B, waveform 400 is separated into thirty-five millisecond sequences labeled sequence M', sequence M'+1, sequence M'+2, etc. FIG. 4B also comprises waveform 402 representing the audio output leaving the receiver. Waveform 402 is substantially identical to waveform 400 except for a timing offset of $T'_{LATENCY}$. The fixed receiver delay, $T_{RCVR}$, remains the same. However, because the sequence length ($T'_{SEQ}$) is decreased to thirty-five milliseconds in FIG. 4B, the total audio latency is reduced to $T'_{LATENCY}$=60 ms. As shown, by controlling audio latency as described, audio latency may be constrained within desired limits while maintaining the largest sequence length possible.

Mixing Modes and Channel Assignments

In an embodiment of the invention, audio data may consist of one or more audio data channels. In the case of multiple channels, the audio data for each channel is interleaved with the audio data for the other channels. For example, in a three channel arrangement, a data packet may contain audio samples in the following sequential configuration:

data packet: [channel0/sample0, channel1 /sample0, channel2/sample0, channel0/sample1, channel1/ sample1, channel2/sample1, channel0/sample2, channel1/sample2, channel2/sample2, etc.]

In accordance with an embodiment of the invention, the audio protocol used for audio transmission specifies two fields to associate with the audio data, the first field being the number of channels and the second field being the number of channels to include in a predetermined mixing arrangement, or "standard mix." The number of channels to include in the standard mix may also be referred to as the "mix mode." Both fields may be represented in a single byte by granting each field four bits. This allows for up to sixteen channels and sixteen mix modes to be represented.

If fewer mix channels are indicated than the number of channels transmitted, then the channels remaining that are not included in the standard mix are sent directly to audio outputs corresponding to those channels. If the receiver hardware does not include support for those channels outside of the standard mix, then those channels are dropped.

If the same number or more mix channels are specified than the number of channels transmitted, then the receiver is free to use any synthesis available to reproduce those channels. For example, if two channels are sent and six channels are specified in the standard mix, and the receiver has six or more outputs, then the receiver could reproduce the output using a matrix scheme giving six channels.

One possible "standard mix" arrangement is provided as Table 1 below, vertically indexed by the mix mode, and horizontally indexed by channel number:

TABLE 1

| Mix Mode | Received Channel Assignments | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| | | | | Bottom | | | | | | | | Top | | | | |
| 0 | 1 | 2 | 3 | 4 | 5 | 6 | 7 | 8 | 9 | 10 | 11 | 12 | 13 | 14 | 15 | 16 |
| 1 | FC | 2 | 3 | 4 | 5 | 6 | 7 | 8 | 9 | 10 | 11 | 12 | 13 | 14 | 15 | 16 |
| 2 | FL | FR | 3 | 4 | 5 | 6 | 7 | 8 | 9 | 10 | 11 | 12 | 13 | 14 | 15 | 16 |
| 3 | FL | FR | RC | 4 | 5 | 6 | 7 | 8 | 9 | 10 | 11 | 12 | 13 | 14 | 15 | 16 |
| 4 | FL | FR | RL | RR | 5 | 6 | 7 | 8 | 9 | 10 | 11 | 12 | 13 | 14 | 15 | 16 |
| 5 | FL | FR | RL | RR | FC | 6 | 7 | 8 | 9 | 10 | 11 | 12 | 13 | 14 | 15 | 16 |
| 6 | FL | FR | RL | RR | FC | SW | 7 | 8 | 9 | 10 | 11 | 12 | 13 | 14 | 15 | 16 |
| 7 | FL | FR | RL | RR | FC | SW | TC | 8 | 9 | 10 | 11 | 12 | 13 | 14 | 15 | 16 |
| 8 | FL | FR | RL | RR | FC | SW | CL | CR | 9 | 10 | 11 | 12 | 13 | 14 | 15 | 16 |
| 9 | FL | FR | RL | RR | FC | SW | CL | CR | FC | 10 | 11 | 12 | 13 | 14 | 15 | 16 |
| 10 | FL | FR | RL | RR | FC | SW | CL | CR | FL | FR | 11 | 12 | 13 | 14 | 15 | 16 |
| 11 | FL | FR | RL | RR | FC | SW | CL | CR | FL | FR | RC | 12 | 13 | 14 | 15 | 16 |
| 12 | FL | FR | RL | RR | FC | SW | CL | CR | FL | FR | RL | RR | 13 | 14 | 15 | 16 |
| 13 | FL | FR | RL | RR | FC | SW | CL | CR | FL | FR | RL | RR | RC | 14 | 15 | 16 |
| 14 | FL | FR | RL | RR | FC | SW | CL | CR | FL | FR | RL | RR | RC | TC | 15 | 16 |
| 15 | FL | FR | RL | RR | FC | SW | CL | CR | FL | FR | RL | RR | RC | TC | FC | 16 |
| (16) | FL | FR | RL | RR | FC | SW | CL | CR | FL | FR | RL | RR | RC | TC | CL | CR | key:
numbered channels     direct outputs (if sent)
FC/FL/FR     front center/front left/front right
RC/RL/RR     rear center/rear left/rear right
SW     subwoofer, bottom center, or effects
TC     top center
CL     center left (midway between FL and RL)
CR     center right (midway between FR and RR)

A sixteenth mix mode is defined when fifteen channels are specified by mix mode and sixteen channels are sent. Where two or more channels are given the same output designation (e.g., FL, FR, etc.), those channels are mixed into a composite waveform for output on the specified device.

Interleaved Audio Data for Error Concealment

An embodiment of the invention utilizes data interleaving to prevent long gaps or pops in audio data due to packet loss. Interleaving of the audio data minimizes the number of consecutive samples in an audio sequence that are missed when a packet is lost during network transmission, concealing missed audio data samples between good audio data samples. The remaining small gaps in the audio data may be further concealed using data interpolation techniques to insert approximated data in place of missing audio data.

Audio data is transmitted between the transmitter and the receiver as groups of samples encapsulated in data packets. A number of data packets may be associated with each audio sequence. When a data packet is received by the receiver, the particular audio sequence is identified, and the audio data samples are transferred from the packet to a buffer.

In an embodiment of the invention, an interleave size is specified for packing audio data into data packets. The interleave size designates how many data packets to use for a given sequence, and how to select audio data samples for inclusion in each data packet. For example, an interleave size of three indicates that three data packets are to be used to transmit the audio data for the given sequence, with each data packet storing one audio data sample from each set of three consecutive samples in the sequence. A unique interleave offset, from zero to (interleave size−1), is assigned to each data packet. The interleave offset specifies the starting audio data sample for the given data packet. At the receiver, the interleave size and the interleave offset are used to reconstruct the sound waveform from the audio data samples of the data packets.

Sometimes networks have transmission problems that cause packets to be lost at regular intervals. To disrupt the regularity of packet losses and any resulting periodic sample errors, the order in which data packets are transmitted may be performed in a random or pseudo-random manner. This can be efficiently accomplished by randomizing the interleave offset assignments among the packets for each sequence, as opposed to, for example, having a first packet always begin with the first sample in the sequence and having the second packet always begin with the second sample, etc.

As an example of interleaved data, consider an eight sample sequence with an interleave size of three. Three data packets are used to transmit the audio data. Interleave offsets from zero to (interleave size—1) are randomly assigned to the data packets. Each data packet is filled with audio data samples of the given sequence, beginning at the sample corresponding to the specified interleave offset for the given packet, and incrementing samples by the interleave size until the end of the audio sequence is reached. One possible packet assignment for this example is:

| (samples) | (0 | 1 | 2 | 3 | 4 | 5 | 6 | 7) |
|---|---|---|---|---|---|---|---|---|
| packet 1, offset = 1: | | 1 | | | 4 | | | 7 |
| packet 2, offset = 0: | 0 | | | 3 | | | 6 | |
| packet 3, offset = 2: | | | 2 | | | 5 | | |

By interleaving in this manner, the number of consecutive missing samples in an audio data sequence is constrained to be less than or equal to the number of data packets lost. This is in contrast to a non-interleaved sample arrangement wherein the number of consecutive missing samples is no less than the number of samples in a single packet, and may be as high as the number of packets lost multiplied by the number of samples per packet.

Figure 5:
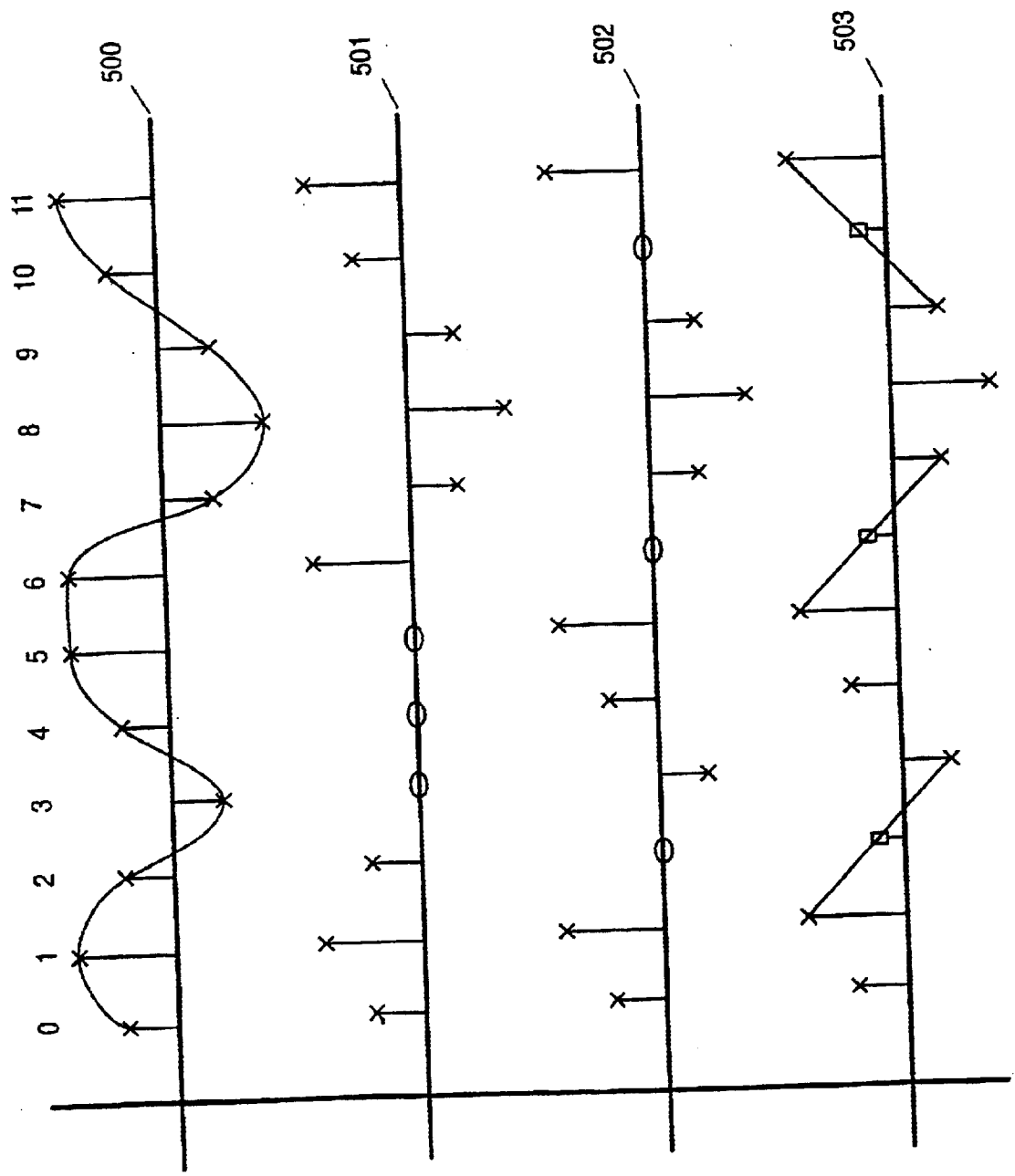
FIG. 5 is a series of waveforms illustrating the effect of interleaving and interpolating audio data in accordance with an embodiment of the invention.

FIG. 5 illustrates the effect of interleaving on an audio sequence. The example shown in FIG. 5 is a sequence comprising twelve audio data samples. The audio data is transmitted in four data packets containing three samples each. Sampled waveform 500 represents the sequence with all audio samples intact. Sampled waveforms 501–503 represent the sequence wherein the second data packet is lost, resulting in three missing samples.

For sampled waveform 501, the data packet sample assignments are (packet 1: 0, 1, 2; packet 2: 3, 4, 5; packet 3: 6, 7, 8; and packet 4: 9, 10, 11). Samples 3, 4 and 5 are missing from waveform 501, resulting in a three-sample gap in the middle of the sequence. The result is a flat waveform where the consecutive samples are missing. The reconstructed waveform will therefore be distorted. The sound distortion resulting from gaps such as the one in waveform 501 becomes greater as the number of samples per data packet increases.

Sampled waveform 502 is constructed from interleaved data samples as discussed above. The data packet sample assignments are (packet 1: 1, 5, 9; packet 2: 2, 6, 10; packet 3: 0, 4, 8; and packet 4: 3, 7, 11). With the loss of the second data packet, samples 2, 6, and 10 are missing from waveform 502. The result is several one-sample gaps which have a much reduced impact on the reconstruction of the sequence than the much larger gap of the non-interleaved waveform 501.

The effects of the gaps in waveform 502 may be further reduced by performing interpolation of the missing samples as illustrated in waveform 503. Any interpolation function may be used to improve sound quality. The interpolation function shown for waveform 503 is linear interpolation, wherein the missing sample is supplied by constructing a line between the two points to either side of the gap formed by the missing sample(s) and determining the value of the line at the sampling instant of the missing sample. The result is a waveform which more closely resembles ideal waveform 500. Higher order interpolation may provide even better results.

Automatic Rate Conversion

In the general sense, in an embodiment of the invention, the transmitter is responsible for transforming an audio stream into the sampling rate specified in the audio protocol for transmissions. This may involve rate conversion of the audio stream to accommodate the protocol. However, for a specific set of sampling rates, rate conversion is performed automatically at the receiver by the interleave and interpolate mechanism. The specific set of sampling rates includes those sampling rates that are integer factors of the sampling rate specified by the protocol. For example, with a 48 kilohertz sample rate, some applicable sampling rates that qualify as integer factors include 4, 6, 8, 12, 16 and 24 kilohertz. Other sampling rates below four kilohertz may also qualify as integer factors, though it is unlikely that lower sampling rates would be used in an audio application.

By specifying an appropriate interleave size, a transmitter may deliver the audio data at these integer factor sampling rates without rate conversion. A simple mechanism for determining an appropriate interleave size is to divide the 48 kilohertz (or other designated protocol sample rate) by the sample rate at issue. The result of this division may be used as the interleave size for data packets delivering the audio data to the receiver. A consistent interleave offset is used to maintain the correct phase of the audio data. For example, eight kilohertz audio data may be sent with an interleave size of six (48/8=6) and a constant interleave offset. The audio data is processed as 48kilohertz data under the assumption that only one data packet out of six successfully reaches the receiver. The interpolation function at the receiver automatically supplies the "missing" samples to convert the 8 kilohertz audio data to 48 kilohertz. Other combinations of interleave sizes and interleave offsets may be similarly applied to affect the same automatic rate conversion. For example, eight kilohertz audio data may be delivered with an interleave size of twelve and consistent use of interleave offsets that are six samples apart (e.g., consistent use of interleave offsets of (0,6), (1,7), (2,8), etc.).

In the manner illustrated above, a transmitter uses interleave size values to establish sample positions associated with a 48 kilohertz sampled sequence. Interleave offset values are used to place the audio data samples into the correct 48 kilohertz sample positions to maintain correct phase. A transmitter is thus able to affect transmission of audio data samples at integer factor sample rates without performing rate conversion. This also means that, when the data provided by the transmitter can be lower bandwidth, lower bandwidths can be passed on to the network. The receiver interprets the transmitted audio data as 48 kilohertz data, and processes the audio data accordingly.

Flow Processes Implementing Audio Protocol

Figures 6A, 6B, 6C:
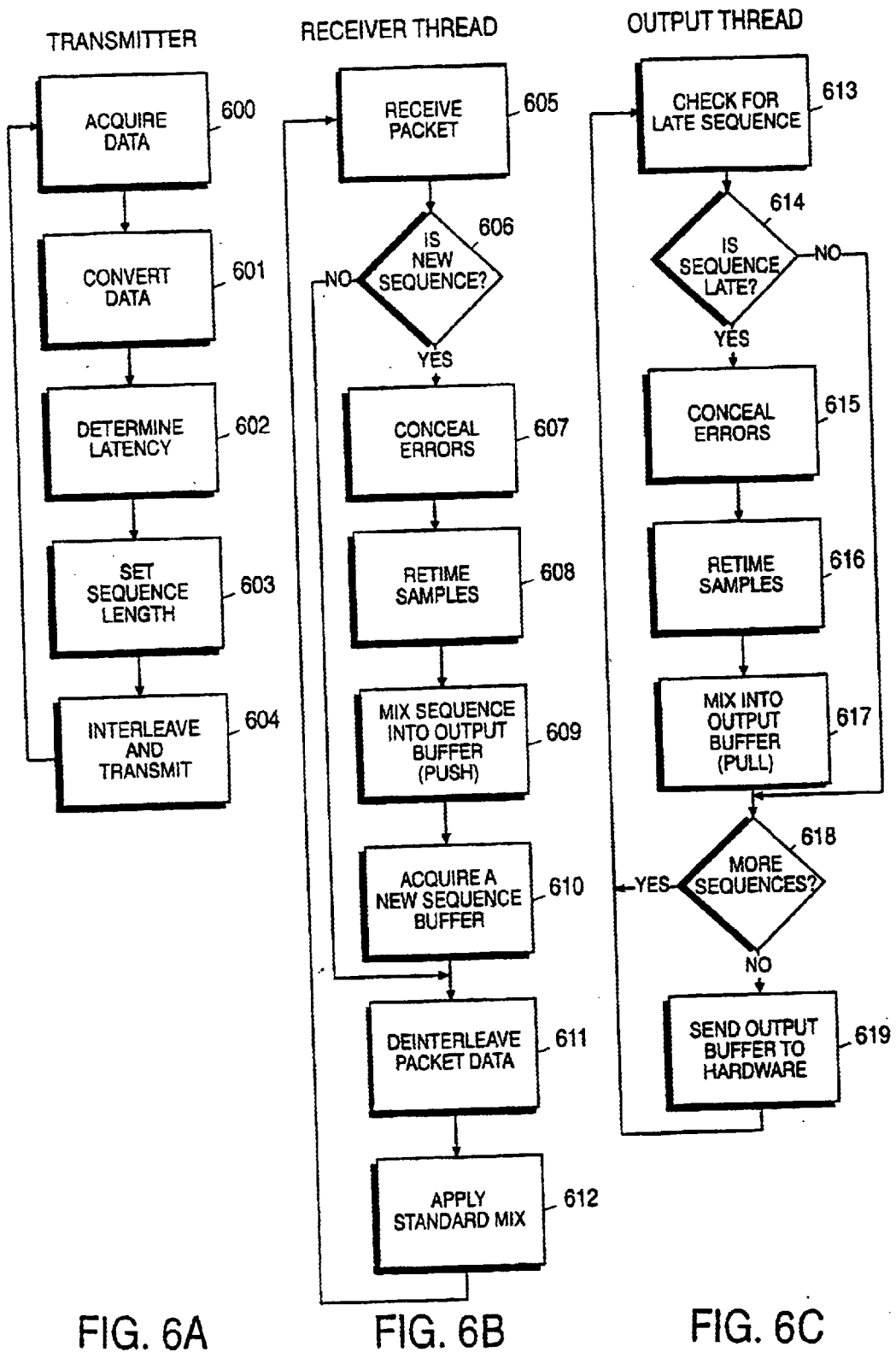
FIGS. 6A–6C are flow diagrams of networked audio data processing in accordance with an embodiment of the invention.

FIG. 6A is a flow diagram illustrating the steps implemented by a transmitter to process audio data in accordance with an embodiment of the invention. In step 600, the transmitter acquires audio data for transmission to the receiver. The audio data may be acquired by any mechanism, such as capture of an audio signal using a hardware capture board, generation of audio data by an audio service, or input of audio data from an audio input device such as a microphone or electronic instrument. Once the audio data has been acquired, the audio data is converted as necessary in step 601 to conform to the protocol specified for audio data transmissions. This conversion may include, for example, one or more of the following: sampling rate conversion, resolution conversion, and quantizing linearization. However, some sampling rates may be automatically converted by the receiver as described earlier in the specification.

In step 602, the transmitter determines what the maximum allowable latency is for the audio application associated with the audio data. In step 603, a sequence length is determined, based on the maximum allowable latency and fixed receiver delay, which satisfies the latency requirement. In step 604, the transmitter interleaves the audio data into data packets and transmits the data packets to the receiver. After step 604, the process returns to step 600.

FIGS. 6B and 6C are flow diagrams of receiver processes for handling audio data in accordance with an embodiment of the invention. The receiver is primarily responsible for receiving data from the network, assembling a sequence by deinterleaving and performing the standard mix, retiming the received data rate to the audio output hardware's data rate, then mixing the data into the output hardware's data buffer, where audio from multiple transmitters can be heard from the audio output. This process is done in one embodiment of the invention with two threads of execution: a receiver thread that receives and deinterleaves the data, and an output thread that outputs completed sequences to the hardware buffer.

FIG. 6B illustrates one embodiment of the flow of the receiver thread. In step 605, a new data packet is received. In step 606, the receiving thread parses the packet header and extracts the sequence number. If the sequence number matches the sequence number of the previous packet received, the process jumps to step 611. However, if the sequence number is different than the sequence number of the previous packet received, the process branches to step 607 to process the current sequence for output and set up resources for the new sequence identified in the new data packet.

In step 607, error concealment (e.g., interpolation) is performed on the current sequence to account for missing samples. In step 608, the samples of the current sequence are retimed, and in step 609, the current sequence is mixed into the hardware output buffer. The step of the receiver mixing the sequence into the hardware output buffer is referred to as a "push" operation because the current sequence is being "pushed" into the output buffer by the arrival of a new sequence. In step 610, a new sequence buffer, having a length as specified in the header of the new data packet, is allocated for the new sequence. From step 610, the process continues to step 611 to begin processing the contents of the new data packet.

In step 611, the audio data is extracted from the new data packet according to the packet length, the interleave size, and the interleave offset. While extraction is occurring, the samples are mixed into the sequence buffer in accordance with the specified mix mode, as indicated by step 612. Channelization of the sequence buffer is dependent on the number of channels supported by the audio output hardware. From step 612, the process returns to step 605 for receipt of a new data packet.

FIG. 6C is a flow diagram of the receiver's output thread. Normally, the output thread consumes data from the hardware output buffer and copies it to the audio output hardware. As the output thread consumes data from the hardware output buffer, the output thread checks each sequence buffer to see when it is scheduled for output. If the output thread catches up with the sequence, the output thread causes the partially received sequence to be mixed immediately as described above for the receiving thread process. In a networked environment, this problem is caused less by sample timebase rate errors, and more by the presence of network latency jitter causing a sequence to complete late. As the receiver thread is able to "push" a sequence of data into the output buffer when triggered by the arrival of a data packet for a new sequence, the output thread is able to "pull" a sequence into the output buffer by triggering the mixing of the sequence when the sequence is late.

In step 613 of FIG. 6C, the output thread checks a sequence buffer to determine when the associated sequence is scheduled for output. In step 614, if the sequence is not late based on its output schedule, the process continues at step 618. However, if it is determined in step 614 that the sequence is late, i.e., behind schedule, the output thread initiates error concealment of the sequence in step 615 and performs retiming of the sequence in step 616. In step 617, the retimed sequence is mixed into the output buffer. Step 617 continues to step 618. Steps 615–617 are referred to as a "pull" operation because the possibly incomplete sequence is being "pulled" into the output buffer to meet the output schedule of the receiver.

In step 618, the output thread determines whether other sequences are in progress that may require mixing into the current output buffer. If there are no further sequences, the output buffer is sent to the audio hardware in step 619, and the process returns to step 613. If, in step 618, there are other sequences that may require mixing into the current output buffer, the process returns to step 613 to check the next sequence.

As indicated in FIGS. 6B and 6C discussed above, in accordance with an embodiment of the invention, a latency test is performed to determine whether a sequence is earlier or later than expected. If the latency is changing, then the data is being delivered by the transmitter faster or slower than the data is being consumed by the audio hardware. This is likely since the transmitter is operating using a timebase independent of that used by the receiver. If the transmitter is faster, then the audio hardware will fall behind in output production and cause a buffer overflow. If the transmitter is slower, the buffers will underflow and the audio output from the receiver will stop occasionally. To compensate for this, the output mixer deletes a small number of samples per sequence in a retiming step if an increase in latency is detected, e.g., during a "push" operation, and adds a small number of samples per sequence during the retiming step if a decrease in latency is detected, e.g., during a "pull" operation. In one embodiment of the invention, samples are added or deleted, as appropriate, and then filtered using an interpolation scheme. This "push-pull" processing model is made possible by the sample interleaving and error concealment scheme.

Network Implementation of Audio Protocol

Figure 7:
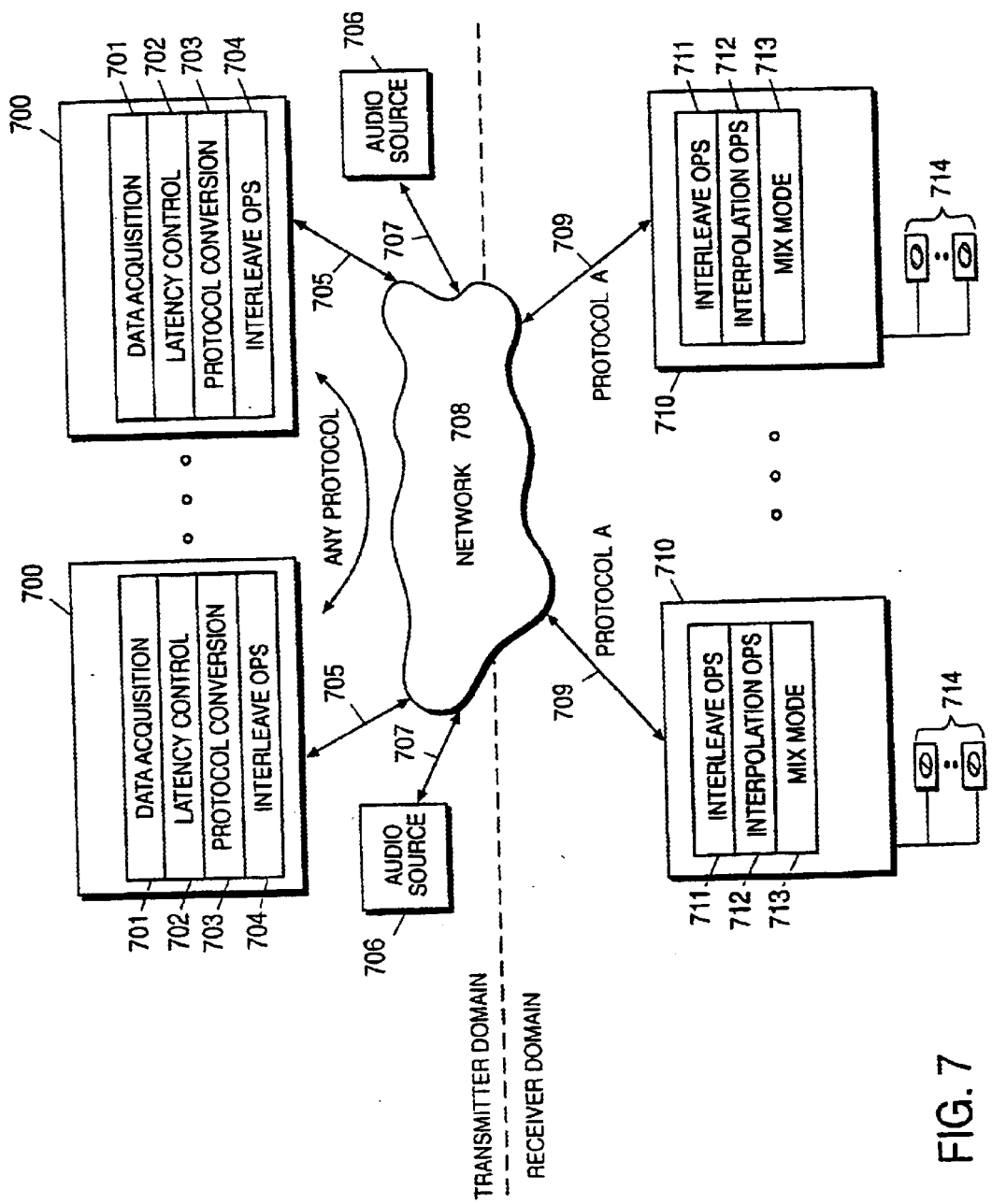
FIG. 7 is a block diagram of a network environment in accordance with an embodiment of the invention.

FIG. 7 is a block diagram illustrating a network environment in accordance with an embodiment of the invention. FIG. 7 comprises a network 708, multiple transmitters 700, one or more general audio sources 706, and multiple receivers 710.

Transmitters 700 are each coupled to network 708 via a network connection 705, and audio sources 706 are each coupled to network 708 via a network connection 707. Each transmitter 700 comprises an audio data acquisition mechanism 701, a latency control mechanism 702, a protocol conversion mechanism 703 and an interleave operations mechanism 704. General audio sources 706 may be any source of audio data coupled to network 708, such as a standalone audio input device or another computer that does not conform to the designated protocol and therefore communicates audio data to receivers via one of transmitters 700.

Receivers 710 are each coupled to network 708 via a network connection 709. Each receiver 710 comprises an interleave operations mechanism 711, an interpolation mechanism 712, a mix mode mechanism 713, and one or more audio output devices 714. Receivers 710 may also comprise one or more audio input devices (not shown) for acquiring audio data to transmit to one of transmitters 700.

Mechanisms 701–704 and 711–713 may comprise software processes or hardware devices, or a combination of software processes and hardware devices, configured to provide the given function(s). Data acquisition mechanism 701 may include any apparatus that provides audio data, such as a mechanism that captures an audio stream (e.g., from a video signal or telephone line), a software application that reads stored audio data from a memory device, a software application that synthesizes audio data, or communications apparatus that receives audio data either from an audio source (not shown) coupled directly to the transmitter 700 or an audio source 706 coupled to transmitter 700 through network 708.

Latency control mechanism 702 is configured to set the sequence length to meet latency requirements. Protocol conversion mechanism 703 is configured to provide any necessary sampling rate (note that some sampling rates may be automatically converted by the receiver), resolution or quantization conversion of audio data. Interleave operations mechanism 704 is configured to pack and unpack data packets with interleaved audio data samples to facilitate transmission of audio data between transmitter 700 and receiver 710. Transmitter 700 is also configured to specify the mix mode for the audio data.

Interleave operations mechanism 711 is configured to pack and unpack data packets with interleaved audio data. However, interleave operations mechanism 711 operates in conjunction with interpolation operations mechanism 712 to perform error concealment in the presence of packet loss. Mix mode mechanism 713 is configured to provide mixing of channel data and routing of audio data to one or more audio output devices 714 in accordance with the indicated-mix mode.

Transmitters 700 and audio sources 706 are elements of a conceptual transmitter domain, whereas receivers 710 are elements of a conceptual receiver domain. Audio data transmissions between elements in the transmitter domain may be performed under any protocol. However, audio transmissions between elements in the transmitter domain (e.g., transmitters 700) and elements in the receiver domain (e.g., receivers 710) are performed in accordance with a single designated audio protocol (shown as protocol A in FIG. 7). Because support for multiple protocols is confined to transmitters 700, the processing and hardware requirements of receiver 710 are simplified. Any upgrades required to support new protocols, such as new protocol conversion mechanisms, are confined to the transmitter domain, reducing the cost and effort of supporting receivers 710.

Embodiment of Computer Execution Environment
(Hardware)

Figure 10:
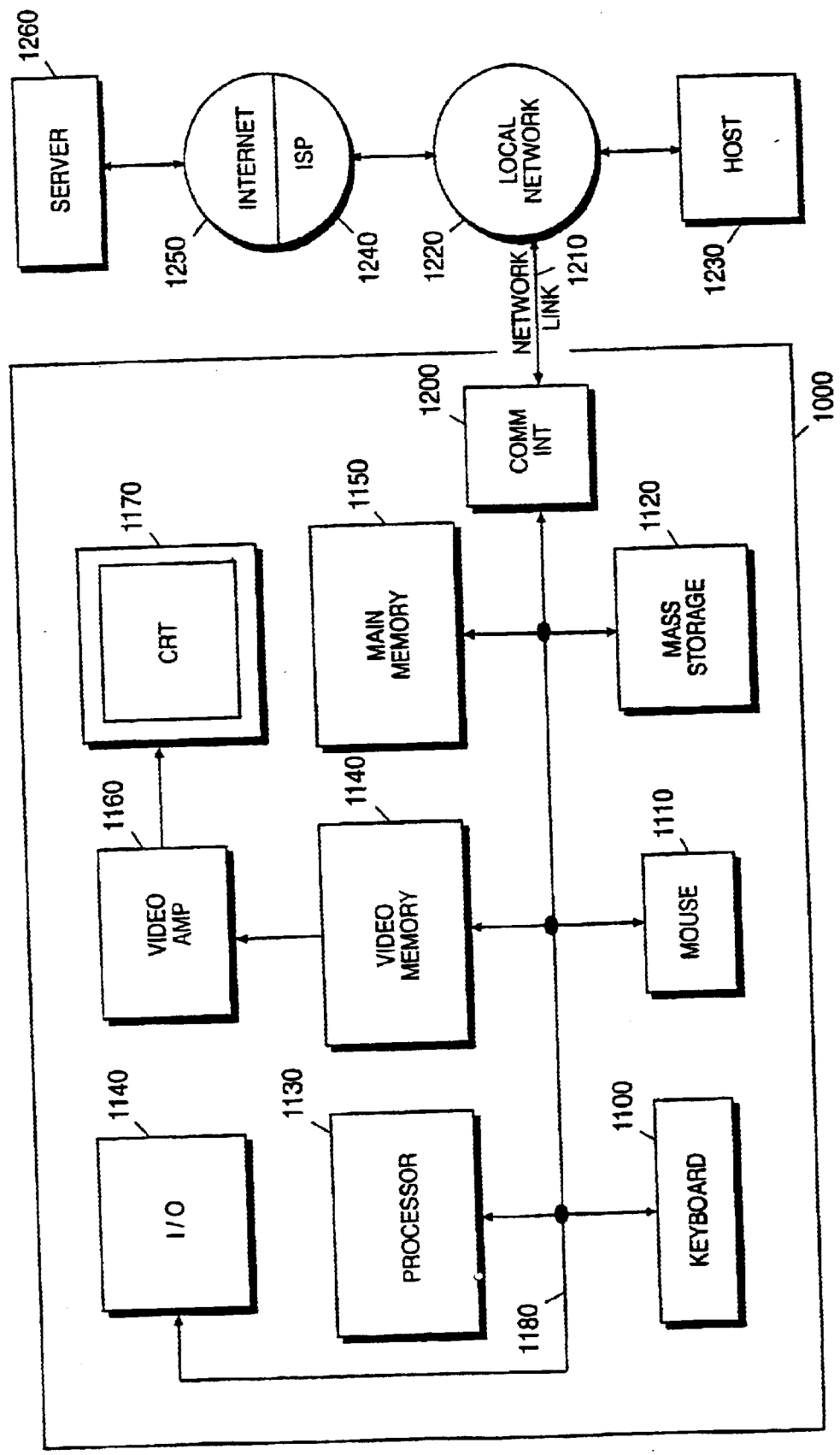
FIG. 10 is a block diagram of a computer execution environment.

An embodiment of the invention can be implemented as computer software in the form of computer readable code executed on a general purpose computers such as computer 1000 illustrated in FIG. 10, or in the form of bytecode class files executable within a Java™ runtime environment running on such a computer. A keyboard 1100 and mouse 1110 are coupled to a bi-directional system bus 1180. The keyboard and mouse are for introducing user input to the computer system and communicating that user input to processor 1130. Other suitable input devices may be used in addition to, or in place of, the mouse 1110 and keyboard 1100. I/O (input/output) unit 1190 coupled to bi-directional system bus 1180 represents such I/O elements as a printer, A/V (audio/video) I/O, etc.

Computer 1000 includes a video memory 1140, main memory 1150 and mass storage 1120, all coupled to bi-directional system bus 1180 along with keyboard 1100, mouse 1110 and processor 1130. The mass storage 1120 may include both fixed and removable media, such as magnetic, optical or magnetic optical storage systems or any other available mass storage technology. Bus 1180 may contain, for example, thirty-two address lines for addressing video memory 1140 or main memory 1150. The system bus 1180 also includes, for example, a 32-bit data bus for transferring data between and among the components, such as processor

1130, main memory 1150, video memory 1140 and mass storage 1120. Alternatively, multiplex data/address lines may be used instead of separate data and address lines.

In one embodiment of the invention, the processor 1130 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 1150 is comprised of dynamic random access memory (DRAM). Video memory 1140 is a dual-ported video random access memory. One port of the video memory 1140 is coupled to video amplifier 1160. The video amplifier 1160 is used to drive the cathode ray tube (CRT) raster monitor 1170. Video amplifier 1160 is well known in the art and may be implemented by any suitable apparatus. This circuitry converts pixel data stored in video memory 1140 to a raster signal suitable for use by monitor 1170. Monitor 1170 is a type of monitor suitable for displaying graphic images. Alternatively, the video memory could be used to drive a flat panel or liquid crystal display (LCD), or any other suitable data presentation device.

Computer 1000 may also include a communication interface 1200 coupled to bus 1180. Communication interface 1200 provides a two-way data communication coupling via a network link 1210 to a local network 1220. For example, if communication interface 1200 is an integrated services digital network (ISDN) card or a modem, communication interface 1200 provides a data communication connection to the corresponding type of telephone line, which comprises part of network link 1210. If communication interface 1200 is a local area network (LAN) card, communication interface 1200 provides a data communication connection via network link 1210 to a compatible LAN. Communication interface 1200 could also be a cable modem or wireless interface. In any such implementation, communication interface 1200 sends and receives electrical, electromagnetic or optical signals which carry digital data streams representing various types of information.

Network link 1210 typically provides data communication through one or more networks to other data devices. For example, network link 1210 may provide a connection through local network 1220 to local server computer 1230 or to data equipment operated by an Internet Service Provider (ISP) 1240. ISP 1240 in turn provides data communication services through the world wide packet data communication network now commonly referred to as the "Internet" 1250. Local network 1220 and Internet 1250 both use electrical, electromagnetic or optical signals which carry digital data streams. The signals through the various networks and the signals on network link 1210 and through communication interface 1200, which carry the digital data to and from computer 1000, are exemplary forms of carrier waves transporting the information.

Computer 1000 can send messages and receive data, including program code, through the network(s), network link 1210, and communication interface 1200. In the Internet example, remote server computer 1260 might transmit a requested code for an application program through Internet 1250, ISP 1240, local network 1220 and communication interface 1200.

The received code may be executed by processor 1130 as it is received, and/or stored in mass storage 1120, or other non-volatile storage for later execution. In this manner, computer 1000 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Human Interface Device Computer System

The invention has application to computer systems where the data is provided through a network. The network can be a local area network, a wide area network, the internet, world wide web, or any other suitable network configuration. One embodiment of the invention is used in computer system configuration referred to herein as a human interface device computer system.

Figure 8:
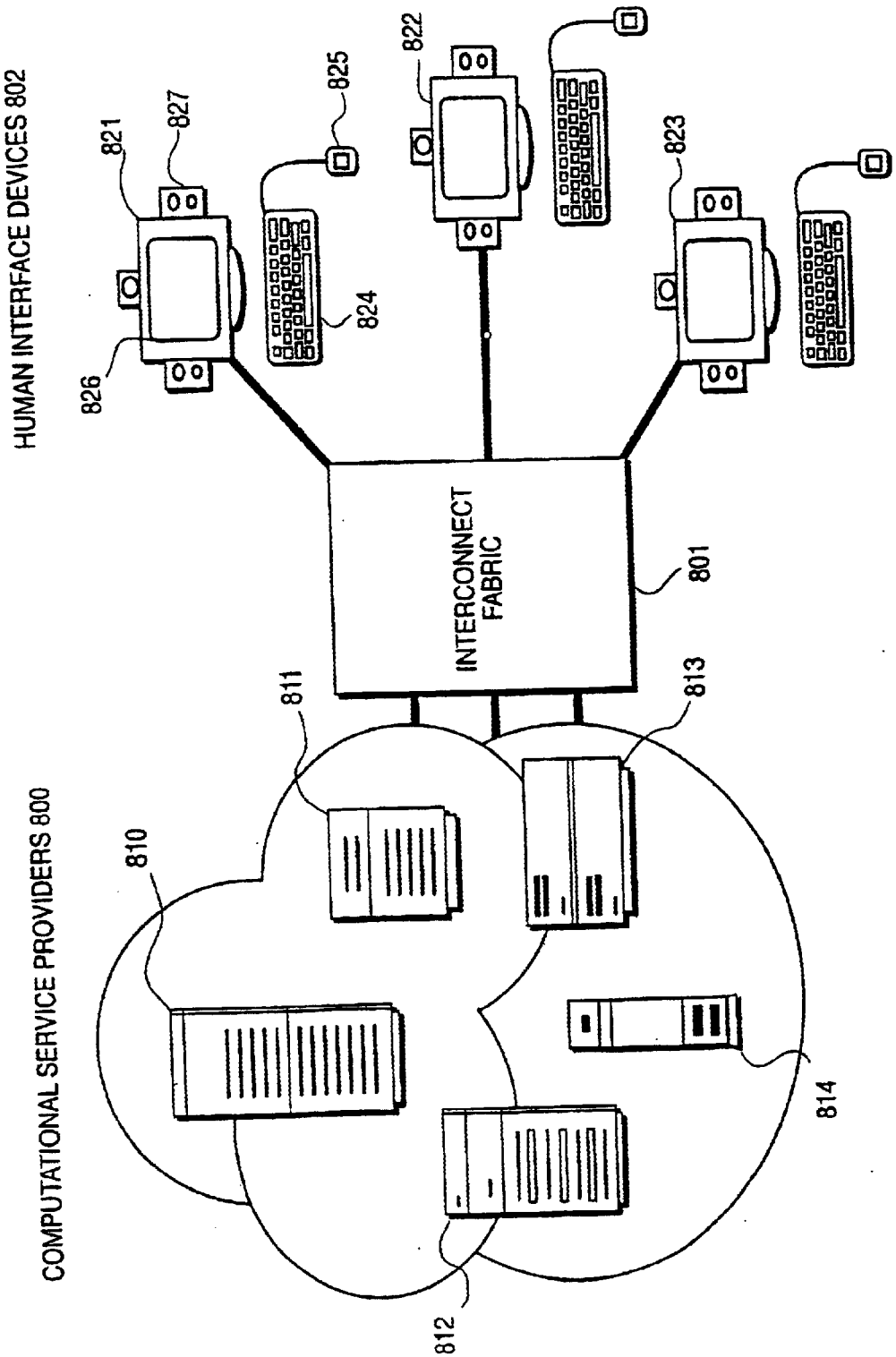
FIG. 8 is a block diagram of a human interface device computer system.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 8. Referring to FIG. 8, the system consists of computational service providers 800 communicating data through interconnect fabric 801 to HIDs 802.

Computational Service Providers—In the HID system, the computational power and state maintenance is found in the service providers, or services. The services are not tied to a specific computer, but may be distributed over one or more traditional desktop systems such as described in connection with FIG. 10, or with traditional servers. One computer may have one or more services, or a service may be implemented by one or more computers. The service provides computation, state, and data to the HIDs and the service is under the control of a common authority or manager. In FIG. 8, the services are found on computers 810, 811, 812, 813, and 814. In an embodiment of the invention, any of computers 810–814 could be implemented as a transmitter.

Examples of services include X11/Unix services, archived video services, Windows NT service, Javaυ program execution service, and others. A service herein is a process that provides output data and responds to user requests and input.

Interconnection Fabric—The interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 8 illustrates HIDs 821, 822, and 823. A HID consists of a display 826, a keyboard 824, mouse 825, and audio speakers 827. The HID includes the electronics need to interface these devices to the interconnection fabric and to transmit to and receive data from the services. In an embodiment of the invention, an HID is implemented as a receiver.

Figure 9:
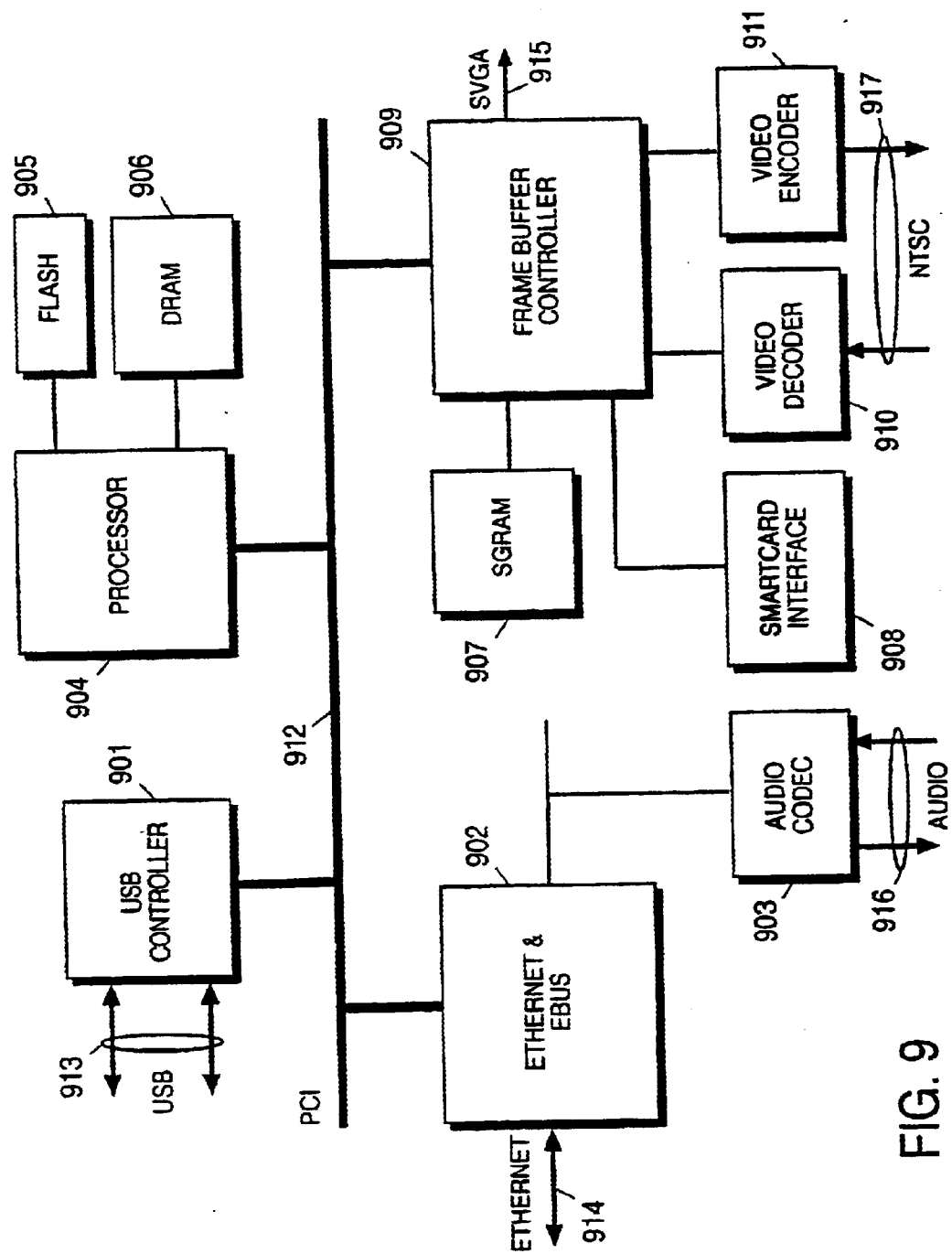
FIG. 9 is a block diagram of an embodiment of a human interface device.

A block diagram of the HID is illustrated in FIG. 9. The components of the HID are coupled internally to a PCI bus 912. A network control block 902 communicates to the interconnect fabric, such as an ethernet, through line 914. An audio codec 903 receives audio data on interface 916 and is coupled to block 902. USB data communication is provided on lines 913 to USB controller 901.

An embedded processor 904 may be, for example, a Sparc2ep with coupled flash memory 905 and DRAM 906. The USB controller 901, network controller 902 and embedded processor 904 are all coupled to the PCI bus 912. Also coupled to the PCI 912 is the video controller 909. The video controller 909 may be for example, and ATI RagePro+ frame buffer controller that provides SVGA output on line 915. NTSC data is provided in and out of the video controller through video decoder 910 and video encoder 911 respectively. A smartcard interface 908 may also be coupled to the video controller 909.

The computer systems described above are for purposes of example only. An embodiment of the invention may be implemented in any type of computer system or programming or processing environrnent.

Thus, a method and apparatus of supporting an audio protocol in a network environment have been described in conjunction with one or more specific embodiments. The invention is defined by the claims and their full scope of equivalents.

What is claimed is:

1. An apparatus comprising:
   a network;
   a Human Interface Device (HID) comprising a receiver and providing interface services to a user;
   a computational service provider comprising a transmitter and providing a computational power and a state maintenance that have been off-loaded from said HID to said user through said HID via said network; and
   one or more audio sources providing video data to said transmitter in accordance with a plurality of audio protocols;
   wherein said receiver supports a single audio protocol over said network;
   wherein said transmitter is coupled to said receiver over said network;
   wherein said transmitter converts said audio data from said one or more video sources into converted audio data that conforms to said single audio protocol;
   wherein said transmitter interleaves said converted audio data; and
   wherein said receiver de-interleaves said converted audio data.

2. The apparatus of claim 1, wherein said single audio protocol and said plurality of audio protocols are audio data transmission protocols.

3. The apparatus of claim 1, wherein said transmitter is provided with a fixed receiver delay, wherein said transmitter is configured to determine a maximum latency, and wherein said transmitter is further configured to specify a sequence length based on said maximum latency and said receiver delay.

4. The apparatus of claim 3, wherein said transmitter is configured to specify said sequence length before interleaving said converted audio data.

5. The apparatus of claim 1, wherein said transmitter is configured to perform latency control.

6. The apparatus of claim 5, wherein said transmitter performs latency control in an adaptive manner.

7. The apparatus of claim 1, wherein said transmitter is configured to transmit said converted audio data to said receiver in a plurality of packets.

8. The apparatus of claim 7, wherein each of said plurality of packets comprises an interleave size and a randomly assigned interleave offset.

9. The apparatus of claim 7, wherein interleave offsets from zero to an interleave size minus one are randomly assigned to said plurality of packets.

10. The apparatus of claim 7, wherein said transmitter is configured to determine a maximum latency, wherein said transmitter is further configured to specify a sequence length based on said maximum latency, and wherein said receiver is configured to write said plurality of packets into a buffer of said specified length.

11. The apparatus of claim 10, wherein said receiver is further configured to interpolate absent audio samples in said buffer.

12. The apparatus of claim 10, wherein said receiver is further configured to re-time a plurality of audio samples in said buffer.

13. The apparatus of claim 10, wherein said receiver is further configured to mix said buffer of said specified sequence length into an output buffer.

14. The apparatus of claim 13, wherein said receiver is further configured to detect a late sequence and to force-mix said late sequence into said output butter.

15. The apparatus of claim 7, wherein said transmitter is configured to pseudo-randomly transmit said plurality of packets over said network to disrupt any periodicity in packet transmission performance.

16. The apparatus of claim 7, wherein at least one of said plurality of packets comprises an audio sequence number.

17. The apparatus of claim 7, wherein at least one of said plurality of packets comprises a sequence length.

18. The apparatus of claim 7, wherein at least one of said plurality of packets comprises a packet length.

19. The apparatus of claim 7, wherein at least one of said plurality of packets comprises an interleave size of a current audio sequence.

20. The apparatus of claim 19, wherein at least one of said plurality of packets comprises an interleave offset.

21. The apparatus of claim 7, wherein at least one of said plurality of packets comprises a mix mode field specifying an output arrangement for one or more audio channels.

22. The apparatus of claim 7, wherein at least one of said plurality of packets comprises a channel field specifying a number of audio channels in a current packet.

23. The apparatus of claim 1, wherein said receiver is configured to generate interpolated audio data.

24. The apparatus of claim 1, wherein said receiver is configured to output said converted audio data to one or more output devices in accordance with a mix mode specified by said transmitter.

25. The apparatus of claim 24, wherein said receiver is configured to mix a plurality of audio channels based on said mix mode.

26. The apparatus of claim 1, wherein said single audio protocol comprises an audio data sample rate standard, an audio data resolution standard, and an audio data quantizing linearization standard.

27. The apparatus of claim 26, wherein said transmitter converts said audio data from said one or more video sources into converted audio data that conforms to said audio data sample rate standard, said audio data resolution standard, and said audio data quantizing linearization standard.

28. An apparatus for processing audio data in a Human Interface Device Computer System, comprising:
   in a transmitter,
      means for acquiring audio data from one or more audio sources in accordance with a plurality of audio protocols;
      means for converting said audio data to conform to a single audio protocol;
      means for interleaving said converted audio data;

means for transmitting said interleaved and converted audio data to a receiver for said single audio protocol;

in said receiver for said single audio protocol,
    means for receiving said interleaved and converted audio data;
    means for de-interleaving said interleave and converted audio data; and
    means for sending said de-interleaved audio data to one or more output devices.

\* \* \* \* \*